Figure 1:
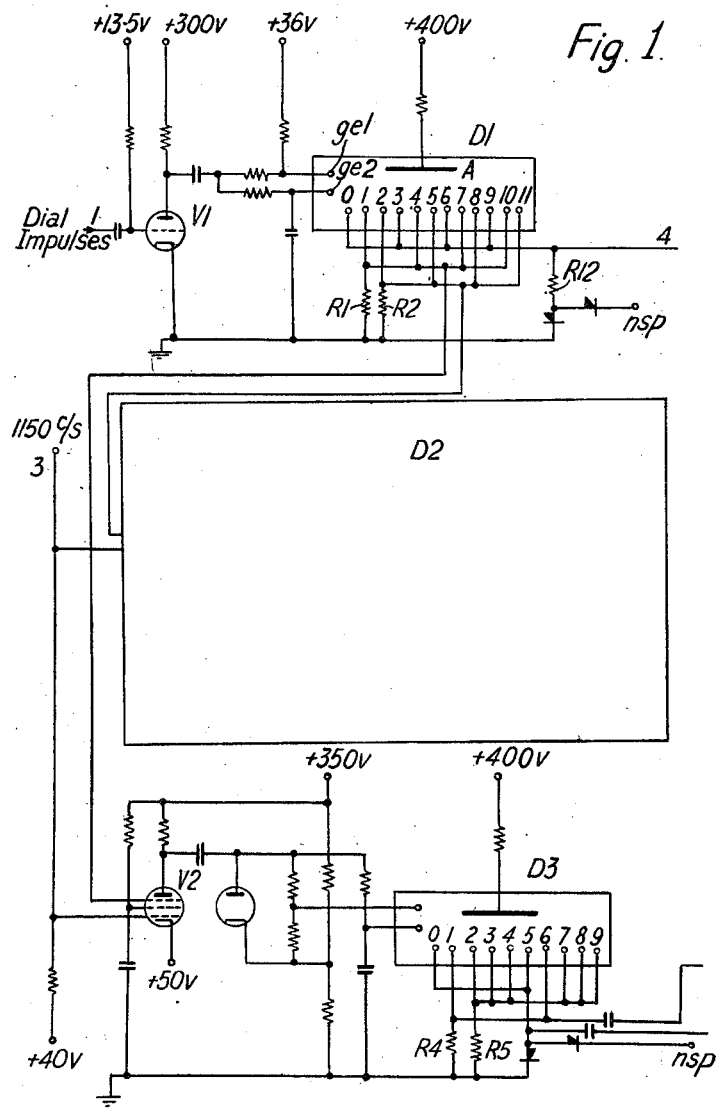

Inventor
BLOOMFIELD JAMES
WARMAN

Aug. 27, 1957   B. J. WARMAN   2,804,604
AUTOMATIC TELEPHONE AND LIKE SELECTING SYSTEMS
Filed Jan. 6, 1956   4 Sheets-Sheet 3

*Inventor*
BLOOMFIELD JAMES
WARMAN

Inventor
BLOOMFIELD JAMES
WARMAN

United States Patent Office 2,804,604
Patented Aug. 27, 1957

2,804,604

AUTOMATIC TELEPHONE AND LIKE SELECTING SYSTEMS

Bloomfield James Warman, Charlton, London, England, assignor to Siemens Brothers & Co. Limited, London, England, a British company Application January 6, 1956, Serial No. 557,722

10 Claims. (Cl. 340—167)

This invention relates to automatic telephone and like selecting systems and more particularly to means for determining at a receiving point the values of digits transmitted from a digit transmitting device.

In the system of the present invention the value of a digit is represented by a time duration interval, intervals being of different lengths according to the value of the digits and the method of determining the value of a digit represented by such an interval permits variation of the duration of the interval within predetermined limits to take account of differences in the speed of operation of different digit transmitting devices.

According to one feature of the invention the digit duration interval is preceded by a reference interval of nominally constant length, but which varies according to the speed of operation of the digit transmitting device, and the duration of the reference interval is utilized as a measure to determine the value of the digit represented by the digit duration interval.

According to a further feature of the invention the duration of the reference interval is measured by causing a counting chain to count during the term of the reference interval to one of a number of counting positions and the duration of the digit duration interval is measured by causing another counting chain, the effective length of which is adjustable in accordance with the number of counting positions of the reference interval counting chain counted during the reference interval, to count cyclically over its effective length for the term of the digit duration interval, the number of complete cycles of the effective length of this latter chain effected during the digit duration interval serving to determine the value of the digit represented by this interval.

According to a further feature of the invention the reference interval counting chain is used cyclically and to avoid the necessity for counting the number of cycles performed by this counting chain in measuring a reference interval, the duration of its cycle is arranged to bear such a relationship to the nominal reference interval that measurement of this interval involves a fixed number of complete cycles of the chain plus a part of a further cycle, said part being such that the counting position along the chain at which the nominal reference interval ends permits the total permissible variation from the nominal reference interval to be accommodated by the counting positions on either side of the said counting position within a single counting cycle of the chain.

According to yet another feature of the invention, the reference and digit duration interval counting chains have a like number of counting positions and during the term of the digit duration interval the digit duration interval counting chain counts cyclically, the number of cycles performed by this counting chain being counted by a further counting chain to the end that each time the digit duration interval counting chain completes a number of counting cycles equal to that predetermined for the reference interval counting chain and arrives at the position coinciding with that previously attained by the reference interval counter, a trigger device is operated to reset the digit duration interval counting chain to its starting position and to transmit an impulse to a counting device acting as a register to advance the register one step.

In the measurement of an interval by means of counting chains as described two difficulties may arise. The first difficulty arises in the measurement of the reference duration interval if this interval corresponds exactly to a given number of nominal steps of the reference interval counting chain. In such a case there is a possibility that due to some fortuitous small delay in the stepping of the counting chain, the given number of steps will not be achieved and the last step fails to be taken. Failure of the reference interval counting chain to take the last step results in the effective length of the digit duration interval counting chain being shorter than it should be and, if the counting chain steps are too coarse, this may result in an impulse being gained in the measuring process. The difficulty can be overcome by providing a sufficiently large number of steps on the counting chains to ensure that failure to take the last step does not result in an impulse being gained.

For the purpose of reference a duration of the reference interval equal to that equivalent to the digit 1 suggests itself as a convenient figure, that is the ratio of the digit duration interval indicating 10 impulses to the reference duration interval equals 10. This gives rise to the second difficulty as there is then the possibility that due to some fortuitous small delay in the stepping of the digit-duration interval counting chain the end of the digit duration interval will occur and action by the digit duration interval counting chain will be arrested before this chain has made the last step that will bring it to the position previously attained by the reference interval counting chain with the result that an impulse may be lost in the measuring process. This difficulty can be overcome by arranging that the reference duration interval is not an exact sub-multiple of the digit duration interval, but is shortened by an amount which will ensure that the digit duration interval will end after the number of impulses represented by the digit duration interval have been counted, that is to say the aforesaid ratio will be greater than 10:1 and that a ratio of between 10:1 and 11:1 will be needed. Clearly, a margin of safety would be provided by making the ratio 10.5:1. However, taking into account the first difficulty mentioned the effect of which is to increase the aforesaid ratio a compromise must be effected and to overcome the second mentioned difficulty we propose that the ratio is always at least 10.25:1 and to overcome the first mentioned difficulty by arranging that the speed of counting is such that at least 21 steps are required to be taken by the reference interval counting chain to measure the shortest reference interval that is likely to be received. Failure of the counting chain to take the last step will cause the ratio to be some higher value such as 10.75. These figures are exemplary and other ratios may be used. To cater for differences in speed of operation of digit transmitting devices a number of counting positions may be provided, a suitable number being 21 to 25. The counting chains may be started and stopped by pulses received from the digit transmitting device which define the commencement and end of the intervals. The counting chains may be stepped in response to pulses from a locally generated source of pulses but the reference and digit duration impulses counting chains need not be stepped directly by these pulses but may be stepped from pulses delivered by a frequency divider stepped directly by the locally generated pulses. If a mean value of 23 steps by the reference interval counting chain be taken and the chain counts in decades, a stepping frequency of 230 pulses per second would be suitable and by the use of a frequency divider having a ratio of 5:1 the locally generated pulses would have a frequency of 1150 pulses per second. Using pulses of only one direction the source would have a frequency of 1150 cycles per second.

Each digit received at the receiving point may be directed to the reference and digit duration interval counting chains by a distributor and another distributor may be stepper synchronously to connect up the registers for the several digits.

The duration of the pulses transmitted from the digit transmitting device for defining the beginning and end of an interval do not enter into the measurements and may be made as short as is convenient.

The several counting chains, distributors and digit registers employed may be high speed relays or electronic discharge devices. Preferably multi-cathode gas-filled cold cathode tubes in which a plurality of counting elements are contained within a single envelope would be used. In such a device a glow is set up between a common anode and one of the cathodes and in response to pulses delivered to the tube the glow is caused to move from one cathode to the next in a predetermined direction, the glow moving at each pulse delivered to the tube.

Although a dial is a usual form of digit transmitting device other means for transmitting digits in a similar manner are to be considered as included within the scope of the invention.

The following description of one method of carrying out the invention as applied to the registration of four digits dialled from a telephone instrument is given by way of example with reference to the accompanying drawings.

The pulses may be transmitted from the dial in any convenient manner and each pulse may consist of a short break in the loop over the two line wires that is closed when the receiver is removed from its rest. The duration of the break is not critical and need only be long enough to bring about operation of the device that is to respond to it.

Figure 2:
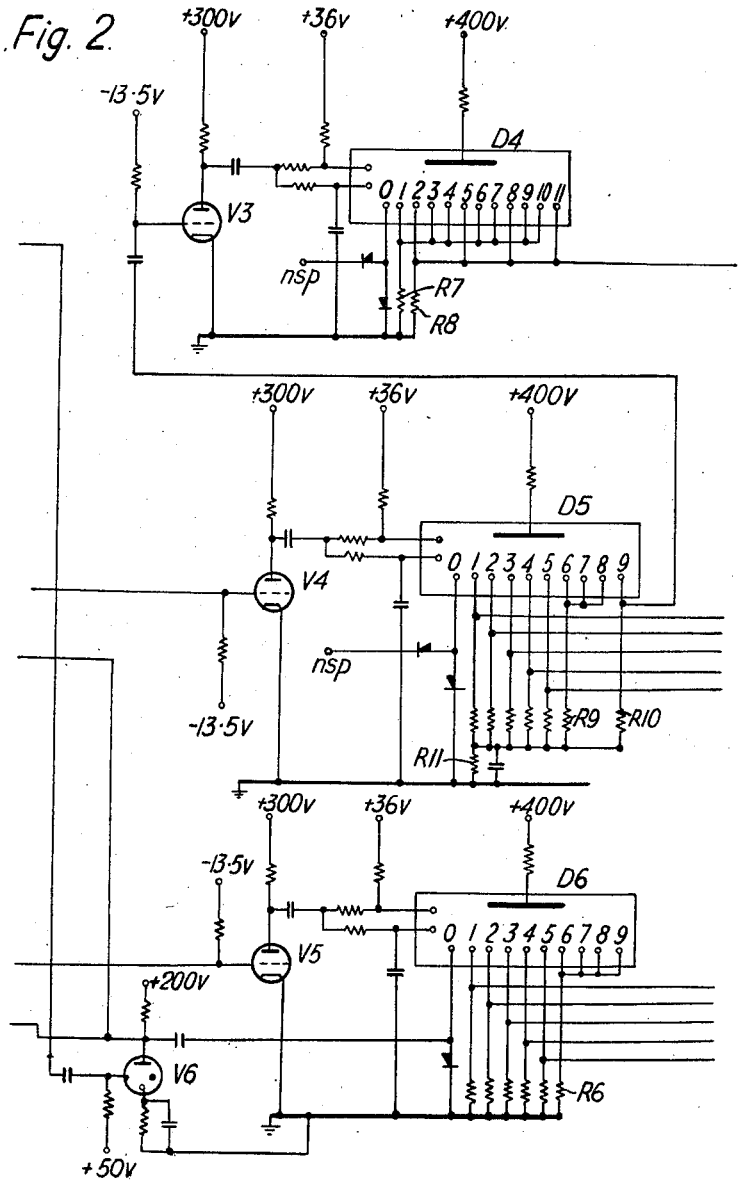
Figure 3:
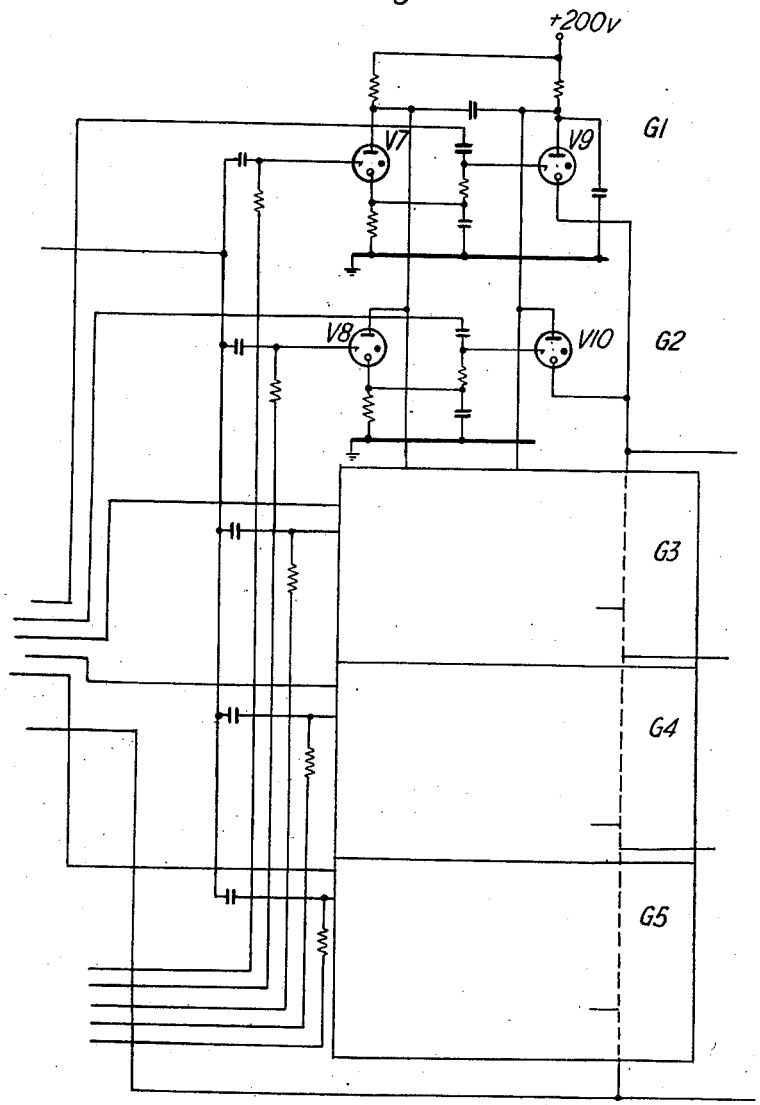
Figure 4:
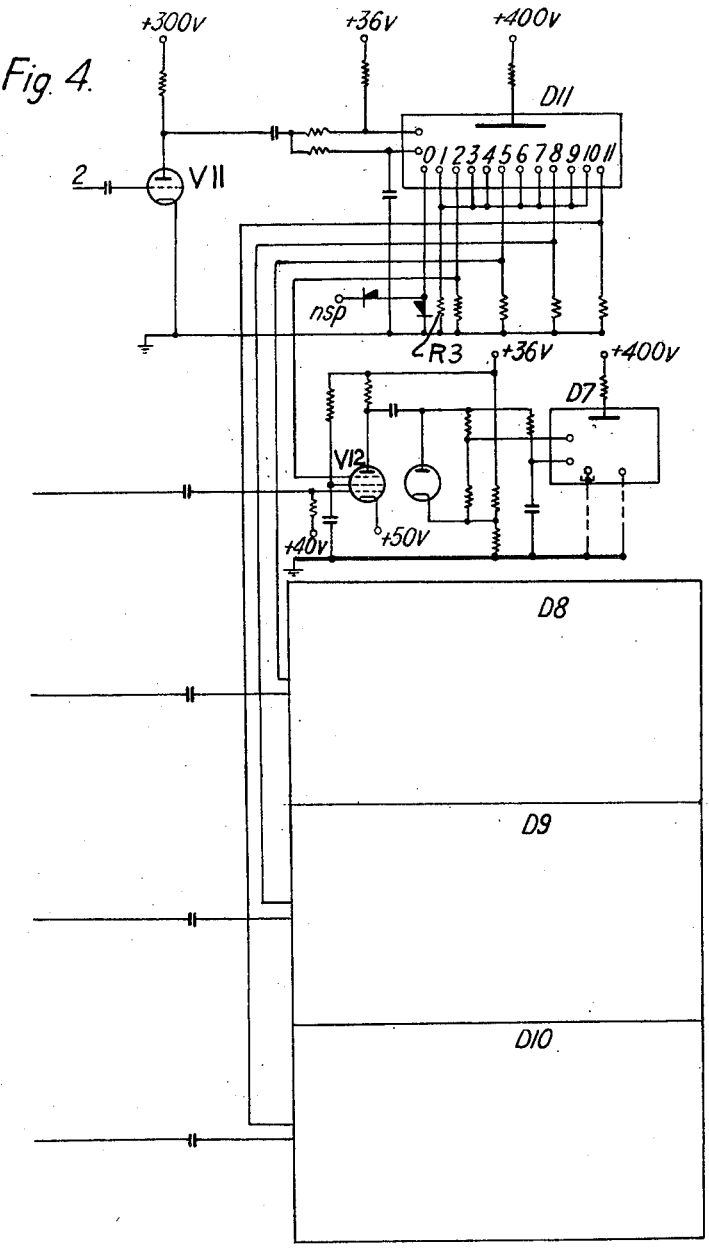

The drawings comprise four figures which should be assembled side by side with Fig. 1 on the left. Fig. 1 shows a first distributor D1 with gate thermionic valve V1, and two frequency dividers one of which, D3 is shown in full with gate valve V2 and the other of which, which is identical with D3, is indicated by the rectangle D2. Fig. 2 shows a decade counter D4 with gate thermionic valve V3 and counters D5 and D6 with gate thermionic valves V4 and V5 respectively. In this figure is also shown a cold cathode gas filled discharge tube designated V6 for the purpose of restoring to normal the frequency dividers and counter D6. Fig. 3 shows a set of trigger devices, each device G1 to G5 including a primary gate cold cathode gas-filled tube and a secondary gate cold cathode gas-filled tube. Only the gates of two devices G1 and G2 are shown in full, and of these the primary gate tubes are designated V7 and V8 and the secondary gate tubes are designated V9 and V10. The other trigger devices are indicated by the rectangles G3, G4 and G5 and are identical with those of device G2. Fig. 4 shows a second distributor D11 with gate thermionic valve V11 and four registers D7 to D10 each with a gate thermionic valve. Only the circuits of register D7 with its gate valve V12 are shown fully, the registers D8 to D10 with their gate valves being identical with that shown.

The distributors, frequency dividers, counters and registers are multi-cathode gas-filled cold cathode tubes of known kind in which in addition to a common anode and the plurality of cathodes each tube includes two guide structures with electrodes positioned between adjacent cathodes which are fed with phase displaced pulses to cause a discharge between the anode and a cathode to shift in a particular direction to the next cathode. The register D7 is not shown fully as it is believed that its operation will be sufficiently understood by those skilled in the art from the known operation of such multi-cathode gas-filled discharge tubes with guide electrodes one example of which is known by the name "Dekatron." Accordingly, only the anode, guide electrode terminals and two cathodes are shown.

Before the operations of the circuits are described in detail brief reference will be made to the several multi-electrode cold cathode tubes and the gate circuits.

Each of the first and second distributors, D1 and D11 respectively, the decade counter D4 and the registers D7 to D10 has an anode, designated A in tube D1, guide electrode terminals, designated ge1 and ge2 in tube D1 and 12 cathodes numbered 0–11. The two frequency dividers D2 and D3 and the counters D4 and D5 are identical and are similar to the distributors except that there are only 10 cathodes. In the distributor D1, cathodes 0, 3, 6 and 9 are resting positions and are connected together and to a wire 4 for transmitting a pulse to gate valve V6. Cathodes 1, 4, 7, and 10 are connected together and their circuits include a common resistance R1 across which a potential is developed for the operation of gate valve V2 of the frequency divider D3. Cathodes 2, 5, 8, and 11 are also connected together and their circuits include a common resistance R2 across which a potential is developed for the operation of the gate valve of the frequency divider D2. In the distributor D11, cathodes 1, 3, 4, 6, 7, 9 and 10 are resting positions and are connected together, their circuits including a common resistance R3, cathodes 2, 5, 8 and 11 are active positions, each cathode being connected over an individual resistance across which a potential is developed for the operation of the gate valves of the respective registers D7 to D10.

In the frequency dividers, cathodes 0 and 5 are resting positions and are connected together, cathodes 1 and 6 are marking positions, their circuits including a common resistance R4 across which a potential is developed for the operation of the gate valves of the counters, it being understood that frequency divider D2 and counter D5 are paired for measuring the digit duration interval transmitted from the dial and frequency divider D3 and counter D6 are paired for measuring the reference interval transmitted from the dial. Cathodes 2, 3, 4, 7, 8 and 9 are connected together, their circuit including a common resistance R5 and these cathodes form additional resting positions.

In the counters D5 and D6, which are connected similarly except for cathode 9, cathode 0 is a resting position, cathodes 1 to 5 are counting positions each being connected over an individual resistance across which a potential is developed for the selection of a trigger device of the set shown in Fig. 3. Cathodes 1 to 5 in the tube D6 provide for the priming of the primary gate tubes of the devices G1 to G5 and cathodes 1 to 5 in the tube D5 provide for the firing of the secondary gate tubes of the devices G1 to G5. Cathodes 6, 7, and 8 of the counting tube D5 are connected together and their circuits include a common resistance R9 and the circuit of cathode 9 includes the individual resistance R10. Cathodes 6, 7, 8 and 9 of the tube D6 are also connected together and their circuits include a common resistance R6. No action results when a discharge is positioned on one of the cathodes 6 to 9 of tube D6 or cathodes 6 to 8 of tube D5, a discharge on any one of these being of a transitory nature. Cathode 9 in tube D5 is connected over an individual resistance R10 across which a potential is developed for the transmission of a pulse to the decade counter D4.

In the decade counter D4, cathode 0 is a normal position, cathodes 1, 3, 4, 6, 7, 9 and 10 are resting positions and are connected together, their circuits including a common resistance R7. No action results from the positioning of a discharge on one of these cathodes. Cathodes 2, 5, 8 and 11 are connected together and their circuits include a common resistance R8 across which a potential is developed for the firing of a primed primary gate tube of the devices G1 to G5.

Admission of pulses to the distributor and counters is controlled by simple pulse operating gates, such as the valve V1 and the fall of potential on the anode of such a gate valve which becomes conductive on receipt of a positive pulse on its grid provides phase-displaced pulses on the guide electrodes, the phase displacement being effected by the time constants of the condenser-resistance combinations connected between the valve anode and the terminals of the guide electrodes.

Admission of pulses to the frequency dividers and registers is controlled by a pentode valve which is brought to a threshold condition when the potential of the suppressor grid is raised by the increase in potential across a cathode resistance of the relevant distributor. The associated diode, condensers and resistances provide for the requisite phase displaced negative pulses to the guide electrodes when the gate valve becomes conductive on receipt of pulses on its control grid.

The trigger devices G1 to G5 comprise primary and secondary cold cathode gas-filled gate tubes. Each device is associated with a cathode position in the counters, the primary gate tubes such as V7 being associated with the reference interval counter D6 and primed by a pulse from the relevant cathode position in that counter and the secondary gate tube such as V9 being associated with the digit interval counter D5 and fired by a pulse from the relevant cathode position in that counter after the gate tube has been primed consequent on the firing of the paired primary gate tube by a pulse from the decade counter D4.

Valve V6 is fired on receipt of a pulse from a discharge in distributor D1 to one of the cathodes forming resting positions, the fall of potential on the anode of valve V6 transmitting negative pulses to the frequency dividers and counter D6 for the restoration of the discharges in them to cathodes 0.

A source of pulses at a periodicity of 1150 per second is applied over wire 3 to the control grids of the gate valves associated with the frequency dividers D2 and D3.

Detailed circuit operations take place in the manner now to be described. It is to be understood that when the circuits are taken into use a positive potential will already have been applied to the anodes of the several multi-cathode cold cathode tubes and a negative pulse will have been applied to wire nsp connected to cathode 0 in each of the distributors, frequency dividers and the digit duration interval counting tube. Normally, the initial discharge will take place between the anode and cathode 0 in each of these tubes but it might happen that dialling is interrupted or stopped prematurely leaving the discharge in distributor D1 on one of the cathodes 1 and 2 and the cathodes connected in common with these cathodes. In this event the negative pulse applied to wire nsp will lower the potential of cathodes 0 in the several tubes mentioned above below that of the other cathodes thereby causing the discharge to shift to cathode 0.

The dial is arranged to transmit three pulses for each digit to be transmitted. The first pulse is transmitted after the finger plate has been released after it has been pulled around to the position indicative of the digital value to be transmitted and marks the beginning of the reference interval the second pulse is transmitted after the elapse of an interval corresponding approximately to the duration of a single impulse on an ordinary dial and marks the end of the reference interval and the beginning of the digit duration interval and the third pulse is transmitted just before the dial reaches its normal position and marks the end of the digit duration interval. The interval between the first and second pulses is a reference interval and is individual to the dial and the interval between the second and third pulse is variable according to the digital value to be transmitted and is an integral multiple of the reference interval. The reference interval, in the present example is such that the discharge in the reference interval counter D5 will take from 21 to 25 steps during this period. The frequency dividers are arranged for a division by five of the stepping frequency so that at each five steps of the frequency divider the associated counter takes one step. The pulses for stepping the counters are transmitted from cathode positions 1 and 6 in the frequency dividers. Each pulse from the dial is applied over wire 1 to open the gate valve V1 and over wire 2 to open the gate valve V11. As a result of receipt of the first pulse from the dial in respect of a digit to be transmitted the discharges in the two distributors are shifted from cathode 0 to cathode 1. In tube D1, the appearance of the discharge on cathode 1 brings about a rise in cathode potential and this rise in potential is applied to the suppressor grid of valve V2 to open the gate to tube D3, to admit the 1150 C. P. S. pulses over wire 3 to that tube. The discharge in tube D3 shifts successively from one cathode to the next and each time it is positioned on cathode 1 or 6 a positive pulse will be transmitted to gate valve V5 to cause the discharge on tube D6 to shift to the next cathode in the direction of cathode 9. Thus for each complete traverse of tube D3 two pulses will be delivered to tube D6. After the discharge in tube D3 has made 10 complete traverses the discharge in tube D6 will have made 2 complete traverses of that tube. After a further one to five steps of the discharge in tube D3 another pulse will have been transmitted to tube D6 and the discharge therein will be shifted to cathode 1. If, during the reference interval, the discharge in tube D3 is not stopped after 105 steps have been taken, a further pulse will be delivered in position 6 of tube D3 and the discharge in the counter will be stepped to position 2. If the speed of the dial is such that more than 105 steps are taken by the frequency divider during the reference interval, the counter will take a correspondingly larger number of steps but the differences in dial speed may be sufficiently met if the maximum number of steps taken by the counter during the reference interval be limited to 25 and the minimum number be limited to 21. The second pulse from the dial will cause the discharge in the distributor D11 to shift from cathode 1 to cathode 2. In this position a rise in potential of the cathode will take place and gate valve V12 will open to admit pulses from the trigger devices of Fig. 3 to the register as will hereinafter be referred to. The second pulse from the dial will also cause the discharge in the distributor D1 to shift from cathode 1 to cathode 2 thereby closing the gate to the frequency divider D3 and opening the gate to the frequency divider D2 and the cyclic pulses will cause the frequency divider D2 to step and at every fifth step transmit a pulse to gate valve V4 to cause the discharge in the counter tube D5 to shift to the next cathode in the direction of cathode 9. The counter will continue to step until the third pulse from the dial is received whereupon the discharge in the distributor D1 will shift to cathode 3 and close the gate to the frequency divider D2.

It may be as well to digress for a moment and consider briefly the trigger devices shown in Fig. 3. As explained previously all the devices are similar but in the device G1 a condenser is connected between the anodes of the primary and secondary gate cold cathode gas-filled discharge tubes to isolate the H. T. supply to these tubes. The H. T. supply is connected over individual resistances to the anodes of the tubes of each kind, there being one resistance for the primary tubes V7, V8 and the corresponding primary tubes in devices G3 to G5 and another individual resistance for the secondary tubes V9, V10 and the corresponding secondary tubes in the devices G3 to G5. A rise in potential on a cathode in a counting position of the tube D6 primes the associated primary gate tube which is fired on receipt of a pulse from the decade counter D4. When the primary tube has fired, a priming potential derived from the cathode circuit of that tube is applied to the associated secondary gate tube which will be fired when a pulse is transmitted from the corresponding cathode in the counter tube D5. When the secondary gate tube fires it transmits a pulse to the gate valve of the register connected up at that time by distributor D11 and also brings about the shifting of the discharge in the counter D5 to cathode 0. The resultant drop in anode potential on the secondary gate valve gives rise to a negative pulse over the condenser bridging the anodes of the primary and secondary gate tubes lowering the anode potential on the associated primary gate tube below the value that will maintain a discharge in that tube and the primary gate tube is extinguished. Furthermore, when the secondary gate tube is fired the condenser connected between the anode and earth which become charged when the anode potential was first applied discharges through the fired tube maintaining the discharge in the tube and when the condenser has become discharged the current through the anode resistance is insufficient to maintain the discharge owing to the high value of this resistance and the tube is extinguished. The condenser now becomes recharged in readiness for the next firing of any of the secondary gate tubes.

Returning now to the operation of the counter D5 it will be remembered that corresponding to each ordinary dialled impulse the discharge in tube D5 will have made two complete traverses and from one to five further steps bringing it on to one of the cathodes 1 to 5 and at the time the digit duration interval starts, the discharge in the decade counter D4 will be resting on cathode 0. On the first occasion when the discharge in the counter tube D5 reaches cathode 9 a positive pulse will be transmitted to gate valve V3 to cause the discharge in tube D4 to shift to cathode 1. On the second occasion when the discharge in the counter tube D5 reaches cathode 9 another positive pulse will be transmitted to gate valve V3 to cause the discharge in tube D4 to shift to cathode 2. With the discharge in this position a positive pulse is applied to the primary gate tubes in the trigger devices G1 to G5 and that tube that has been previously primed from reference counter tube D6 will fire. The change of potential across this primary gate tube will be applied to the trigger electrode of the associated secondary gate tube and this will be primed. The discharge in tube D5 continues to step until that cathode of the series numbered 1 to 5 that has been marked by the reference counter by the priming and subsequent firing of a primary gate tube and the priming of the associated secondary gate tube is reached whereupon a positive pulse is transmitted to the primed secondary gate tube to fire it. The cathode circuits of the secondary gate tube includes resistance R11 which is common to the cathodes 1 to 9 of tube D5 and when the marked secondary gate tube fires a positive pulse is transmitted due to the rise of its cathode potential. This pulse is applied to the control grid of the gate valve V12 causing the discharge in the register tube D7 to shift from cathode 0 to cathode 1. The rise in potential of the cathodes 1 to 9 in tube D5 causes the discharge therein which has reached one of the cathodes 1 to 5 to shift to cathode 0 and a pulse to be delivered over the connection to cathode 9 of this tube to gate valve V3 to cause the discharge in tube D4 to shift to cathode 3 which is a resting position. Tube D5 continues to count and on each occasion when the discharge reaches cathode 9 the discharge in the decade counter will be shifted to the next cathode. Thus, after two such occasions the discharge in tube D4 will be shifted to cathode 5 and a firing pulse will be extended to fire the previously marked secondary gate tube resulting in a further pulse being transmitted to shift the discharge in register D7 to cathode 2 and the re-positioning of the discharge in tube D5 to cathode 0 and the shifting of the discharge in tube D4 to cathode 6. At this stage, the interval will have corresponded to two impulses which will have been registered in the register tube D7. If the interval continues, further operations will take place as previously described until the third pulse from the dial is received. The third pulse from the dial causes the discharge in the two distributors to be shifted to cathode 3. In this position of the discharge in tube D1 a pulse derived from resistance R12 will be transmitted over wire 4 to fire the cold cathode tube V6 and as a result of the firing of this tube a negative pulse is applied to cathode 0 of tube D6 lowering its potential below that of the other cathodes in the tube to cause the discharge therein to shift to cathode 0. A similar pulse is applied to cathodes 0 and 5 in tubes D2 and D3 to cause the discharges therein to shift to one of these cathodes. As a result of these operations the priming voltage is removed from the selected primary gate tube. As a result of the appearance of the discharge in tube D11 on cathode 3 the gate valve V12 associated with register D7 will be closed. Apart from the registration in tube D7 all the circuits are in the same condition as they were before dialling commenced. When a second digit is dialled exactly the same operations are performed, the first pulse from the dial causing the discharge in the distributor tube to shift to cathode 4 in which position, as regards tube D1, the gate to the reference interval frequency divider D3 is opened for the operation of that device. The second pulse from the dial causes the discharge in the distributor to shift to cathode 5 in which position, as regards tube D1, the gate to the frequency divider D3 is closed and that to the frequency divider D2 is opened. As regards tube D11 the rise in potential on cathode 5 opens the gate valve associated with register tube D8 to accept pulses in respect of the second dialled digit which is thereupon registered in that register tube. Third and fourth dialled digits are registered in register tubes D9 and D10 in a similar manner and on the completion of the registration of the fourth digit the discharges in tubes D1–D6 and D11 are shifted to cathodes 0 as previously described. After use the registers may be restored to normal by any suitable known means.

What is claimed is:

1. Arrangements for response to digits transmitted from a digit transmitting device in which each digit consists of a reference interval between first and second pulses transmitted from a digit transmitting device followed by a variable duration interval between said second pulse and a third pulse transmitted from said device the arrangements comprising a first counting chain having a plurality of counting positions, a second counting chain having a like plurality of counting positions, means for starting operation of the first counting chain on receipt of said first pulse, means for operating said chain to bring it to a counting position during the reference interval to determine the effective length of the second chain, means for stopping operation of the first chain and starting operation of the second chain on receipt of said second pulse means for operating the second chain to cause it to operate cyclically over its effective length for the duration of the variable duration interval and means for counting and registering the number of complete cycles performed by the second chain during said variable duration interval.

2. Arrangements according to claim 1 in which the first counting chain counts cyclically, the duration of its cycle being arranged to bear such a relationship to the reference interval that measurement of this interval involves a fixed number of complete cycles of the counting chain plus a part of a further cycle, said part being such that the counting position along the chain reached at the end of the reference interval permits the total permissible variation from the nominal reference interval to be accommodated by the counting positions on either side of the nominal counting positions within a single cycle of the chain.

3. Arrangements according to claim 1 including a third counting chain, a trigger device and a register, the third counting chain having a number of positions one more than the number of complete cycles executed by the first counting chain during a reference interval, means for operating the third counting chain on the completion of each cycle executed by the second counting chain, means for operating the trigger device on the attainment by the third counting chain of the last of the said number of positions and means in the trigger device operable on its operation for registering one impulse on the register and for re-setting the second counting chain to its starting position.

4. Arrangements according to claim 1 in which the first counting chain counts cyclically and executes a number of complete cycles plus a part of a further cycle during the reference interval, said arrangements including a third counting chain, a plurality of trigger devices each connected to one of a pair of like counting positions on the first and second counting chains and a register, means for selecting a trigger device in accordance with the position attained by the first counting chain, means for advancing the third counting chain one step at the completion of each complete cycle by the second counting chain, means operative when the third counting chain has been stopped by the completion by the second counting chain of as many complete cycles as were taken by the first counting chain during the reference interval for preparing the selected trigger device and means for operating the prepared trigger device on the subsequent attainment by the second counting chain of a counting position corresponding to that attained by the first counting chain and means operable by the trigger device to register one impulse on the register.

5. Arrangements according to claim 1 including a distributor responsive to the pulses from the digit transmitting device, a first position connected to the starting circuit for the first counting chain and activated by receipt of the first of said pulses a second position connected to the starting circuit for the second counting chain and activated by receipt of the second of said pulses and a third position connected to means for restoring the first counting chain to normal, and activated by receipt of the third of said pulses.

6. Arrangements according to claim 1 including two counting chains acting as frequency dividers and fed with pulses from a local source, one of the said frequency dividers counting during the reference interval and the other counting during the variable duration interval, driving circuits for the said first and second counting chains connected to like specified positions in each frequency divider to cause said first and second counting chains to count multiples of the steps counted by the frequency dividers.

7. Arrangements according to claim 1 including a distributor responsive to the pulses from the digit transmitting device, two counting chains operating as frequency dividers and fed with pulses from a local source, one of said frequency dividers counting during the reference interval and the other counting during the variable duration interval, driving circuits for the said first and second counting chains connected to like specified position in the two frequency dividers respectively to cause said first and second counting chains to count multiples of the steps counted by the frequency dividers, a first position on the distributor connected to the starting circuit for the frequency divider connected to said first counting chain and activated by receipt of the first of said pulses from the digit transmitting device, a second position on the distributor connected to the starting circuit for the frequency divider connected to the second counting chain and activated by receipt of the second of said last mentioned pulses and a third position on the distributor connected to means for restoring to normal both frequency dividers and the said first counting chain and activated by receipt of the third of said last mentioned pulses.

8. Arrangements according to claim 1 including a third counting chain for counting the number of complete cycles executed by the second counting chain before it attains a position corresponding to that attained by the first counting chain, a plurality of trigger devices each of which is connected to a like one of the counting positions on the first and second counting chains, means for selecting a trigger device in accordance with the position attained by the first counting chain during the reference interval and means controlled jointly by said second and third counting chains for operating the selected trigger device when the second counting chain attains the position corresponding to that attained by the first counting chain, a plurality of registers and a distributor responsive to the pulses transmitted by the digit transmitting device having positions connected respectively to switching devices for connecting the trigger devices to the several registers in turn, said positions being activated in response to the third pulse transmitted by the digit transmitting device in respect of each digit transmitted, each operation of a trigger device transmitting an impulse to the register connected up by the switching device operated by the distributor at the time.

9. Arrangements according to claim 7 in which the distributor, frequency dividers and first and second counting chains are multi-cathode gas-filled electric discharge tubes.

10. Arrangements according to claim 10 in which the distributor, first, second and third counting chains and the registers are multi-cathode gas-filled electric discharge tubes.

References Cited in the file of this patent

UNITED STATES PATENTS 2,329,234      Willis _____ Sept. 14, 1943